Aug. 2, 1966   K. J. DOWNS   3,264,006
ANTI-DUST RING
Original Filed April 16, 1962   2 Sheets-Sheet 1
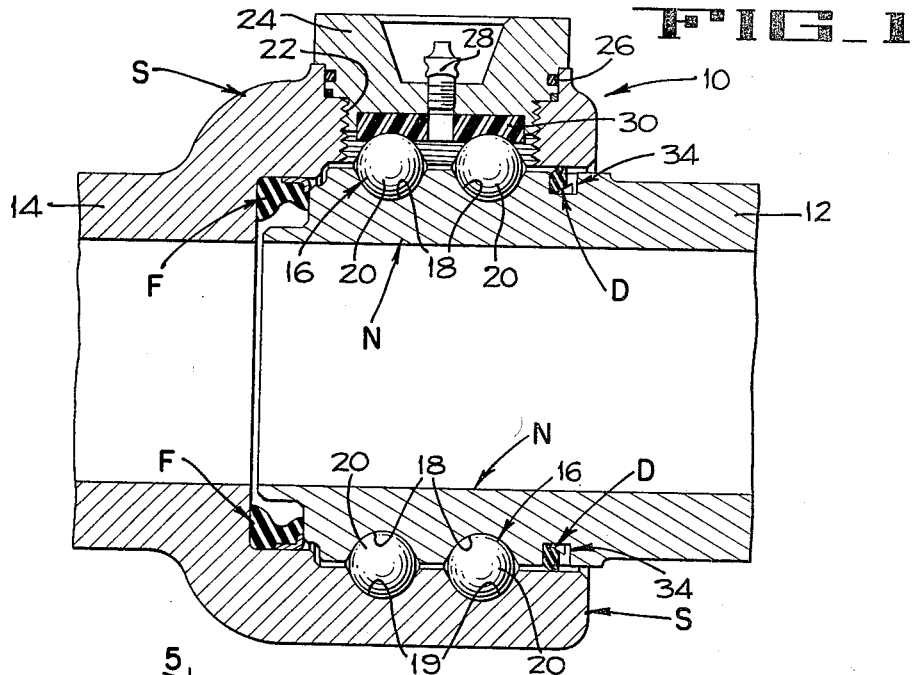
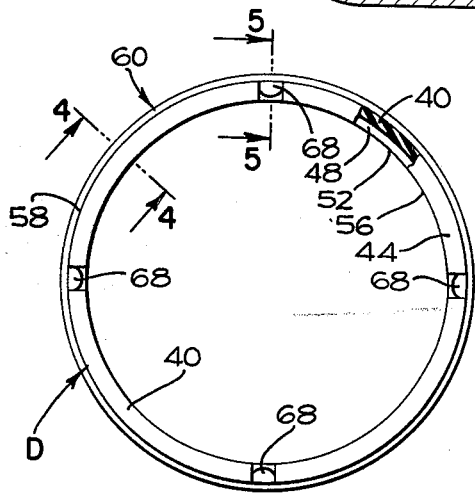
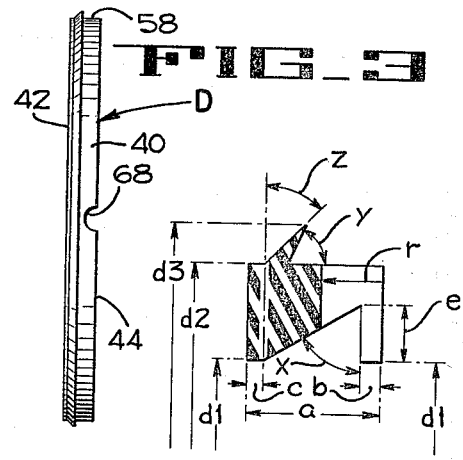
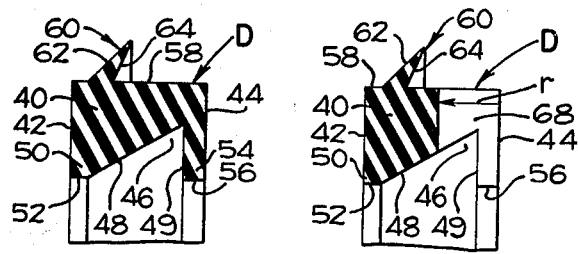
INVENTOR
KENNETH J. DOWNS
BY Hans G. Hofmeister
ATTORNEY Aug. 2, 1966  K. J. DOWNS  3,264,006
ANTI-DUST RING
Original Filed April 16, 1962  2 Sheets-Sheet 2
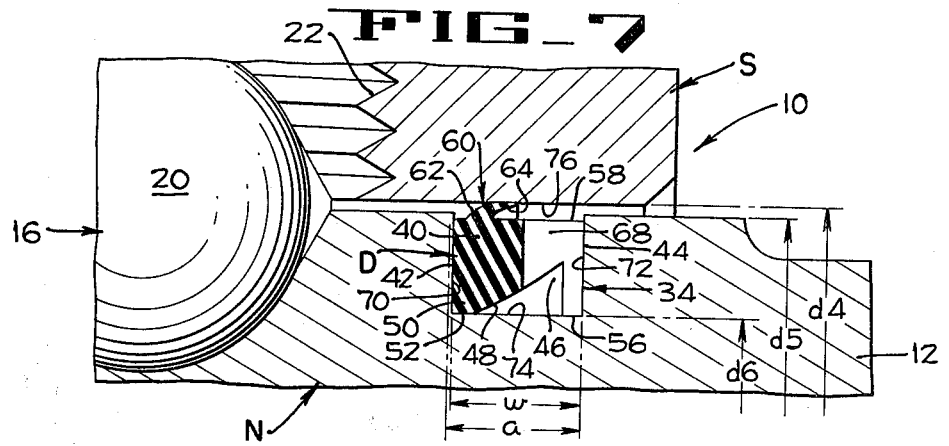
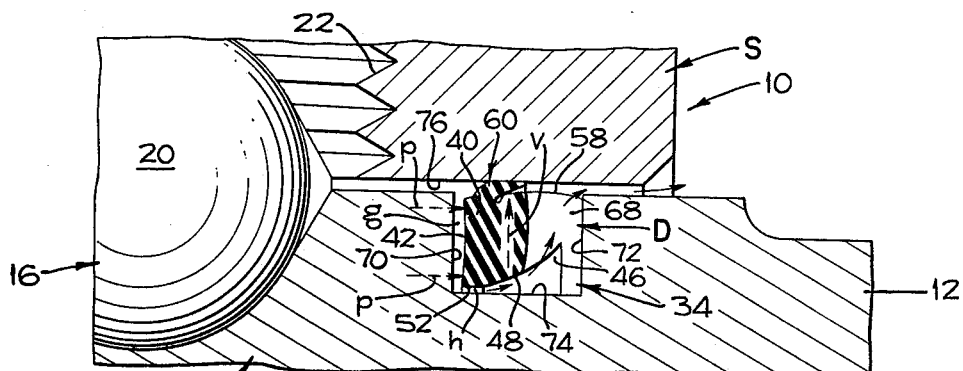
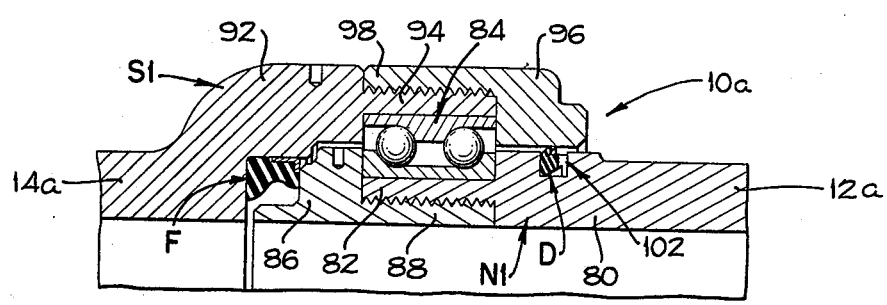
INVENTOR
KENNETH J. DOWNS
BY *Hans G. Hoffmeister*
ATTORNEY

United States Patent Office 3,264,006
Patented August 2, 1966

3,264,006
ANTI-DUST RING
Kenneth J. Downs, Yorba Linda, Calif., assignor to FMC Corporation, San Jose, Calif., a corporation of Delaware
Continuation of application Ser. No. 187,676, Apr. 16, 1962. This application Apr. 23, 1965, Ser. No. 453,871
10 Claims. (Cl. 277—201)

This application is a continuation of my prior pending application, now abandoned entitled "Anti-Dust Ring" filed April 16, 1962, and bearing Serial No. 187,676.

This invention relates to fluid conducting swivel joints or couplings. The swivel joint of the present invention is of the type wherein relatively rotatable pipe sections are provided, having telescoped nipple and sleeve portions, and a combined anti-friction bearing and coupling member is provided between the nipple and the sleeve. In the swivel joint or coupling of the type to which the present invention relates, at least the sleeve element of the joint must be made in composite form in order to provide for assembly of the bearing member between the nipple and the sleeve. Since swivel joints of the type to which the present invention relates are designed to conduct fluids under relatively high pressures, that is, pressures in the order of 6,000 to 15,000 p.s.i., it is necessary to provide an effective fluid seal between the nipple and the sleeve portions of such couplings. This primary or main fluid seal is located between the inner end of the nipple and the surrounding inner end of the sleeve, in order to confine fluid under pressure in the pipe sections, and to prevent it from reaching the bearing portion of the coupling. Couplings of the type to which the present invention relate also include a dust seal, which is disposed between the outer end of the sleeve and the outer end of the nipple, for preventing dust, dirt, water or any other foreign matter from entering the bearing area from outside of the coupling.

When swivel joints or couplings of the type referred to are placed in service in the field, the primary fluid seal that is mounted between the inner ends of the nipple and sleeve portions of the coupling, may occasionally fail. This failure admits fluid under high pressure to the bearing area between the nipple and the sleeve. Since at least the sleeve element of the swivel joint is formed as a composite element in order to provide for assembly of the parts including the anti-friction bearing, if the fluid pressure at the bearing area is not relieved, the sleeve of the coupling may be disrupted. A high velocity is thus imparted to the broken parts, which renders the swivel joint assembly hazardous in service. It has been found that in swivel joints of the type to which this invention relates, which incorporate dust seals or sealing rings, the latter elements under the circumstances just mentioned respond to the action of high pressure fluid against their inner surfaces, by changing their shape in such manner as to trap the fluid within the bearing portion of the swivel joint. It is this trapping of the fluid that can cause disruption of the coupling, with the attendant hazardous conditions described above.

It is an object of the present invention to provide a swivel joint of the character described, wherein the dust sealing ring not only excludes external foreign matter, but also acts as a pressure responsive relief valve. In other words, it is an object of the invention to include a dust sealing ring in a swivel joint of the type described, that acts in response to pressures applied to the inner faces of the dust sealing ring, to bleed fluid under pressure from the zone of the anti-friction bearing. This action of the dust sealing ring of the invention automatically limits the maximum pressure that can be developed within the swivel joint, and thus, prevents disruption of the coupling in the event of failure of the main or primary fluid sealing and confining ring.

It is another object of the present invention to provide a combined dust sealing and internal pressure relieving ring of the type described, which will effectively exclude foreign materials such as dust, dirt, water, or the like, from the interior portions of the swivel joint.

Another object of the present invention is to provide a dust sealing and pressure relieving ring of the character described which can be readily molded from stock formed of rubber or rubber-like material.

The manner in which these and other objects of the present invention may be attained, will be apparent from the following detailed description of the invention. In the drawings:

FIGURE 1 is a fragmentary section of a swivel joint assembly embodying a combined dust sealing and pressure relieving ring forming a part of the present invention.

FIGURE 2 is a front elevation of the dust sealing ring.

FIGURE 3 is a side elevation of the ring.

FIGURE 4 is an enlarged fragmentary section of the ring taken on lines 4—4 of FIGURE 2.

FIGURE 5 is another enlarged fragmentary section of the ring taken on lines 5—5 of FIGURE 2, namely, at one of the fluid bleed notches formed in the body of the ring.

FIGURE 6 is a section of the ring similar to that of FIGURE 5, indicating certain typical reference dimensions.

FIGURE 7 is an enlarged fragmentary section taken through a swivel joint at the zone of installation of the dust sealing ring, and under normal operating conditions.

FIGURE 8 is a section like that of FIGURE 7, showing the operation of the combined dust sealing and pressure relieving ring when exposed to internal fluid pressure from within the swivel joint.

FIGURE 9 is a fragmentaray section showing a modified form of swivel joint having composite nipple and sleeve portions, for mounting a double row ball bearing and race assembly.

A swivel joint assembly embodying the present invention is illustrated in FIGURE 1 of the drawings. The joint is of the type which comprises a pair of co-axial pipe sections including telescoped nipple and sleeve portions and an anti-friction bearing assembly between the primary fluid sealing ring and the dust sealing ring. Access means are provided in the sleeve portion for assembly of the bearing in the joint. Couplings of this general design are known in the art, as represented by the patent to Phillips, 2,396,123, dated March 5, 1946, and that to Warren, 2,459,981, dated January 25, 1949. The swivel joint of the present invention represents an improvement over swivel joints like those disclosed in the patents referred to above. In the swivel joint of this invention, the dust sealing ring acts not only to exclude dust and the like from the bearing area of the joint, but also acts as a pressure relief valve to allow fluid to flow past the dust sealing ring in case the main sealing ring fails.

Referring to FIGURE 1 more specifically, the swivel joint of the invention is indicated generally at 10 and comprises a pipe section 12 having a nipple N formed at the end thereof, and a cooperating pipe section 14 having a sleeve S formed at the end thereof. The nipple N is the inner member, and the sleeve S the outer member, of a pair of telescoped elements of the swivel joint. In order to provide an anti-friction bearing between the nipple and sleeve portions of the swivel joint, and in order to maintain them against relative axial motion, an anti-friction bearing or journal assembly indicated generally at 16 is provided between the nipple and the sleeve. In the form of the invention shown in FIGURE 1, the bearing or journal 16 comprises a double row of bearing balls 20. These balls ride in annular grooves 18 formed in the nipple N, and in grooves 19 formed in the sleeve S. As is described in the aforementioned Phillips and Warren patents, in order to introduce the balls 20 between the swivel joint elements, a threaded access passage 22 is formed in the sleeve. The access passage is closed by a threaded plug 24, after the balls have been positioned in the grooves 18 and 19 in the nipple and sleeve. The access plug 24 is formed with an O-ring seal 26, and is provided with a grease fitting 28. In order that the final position attained by the access plug 24, when it is fully tightened into the coupling sleeve, is not rendered critical, the inner face of the plug 24 is provided with a resilient washer 30 of plastic material, which accommodates formation of an extension of the grooves 19 in the sleeve by the balls 20 upon relative rotation of the coupling parts. The plastic washer 30 of the access plug does not form part of the present invention but is claimed in the co-pending application of Roessler, Serial No. 1,992, filed January 12, 1960, and assigned to the assignee of the present invention.

A main or primary fluid seal F is provided between the inner end portions of the nipple N and the sleeve S, for retaining fluid under pressure within the pipe sections of the swivel joint. Details of the primary seal F and its mounting do not form part of the present invention. Any seal which accommodates relative rotation of the swivel joint sleeve and nipple members and which will maintain a high internal pressure in the swivel joint is satisfactory. Such seals are disclosed in the patent to Allen et al., No. 2,330,197, as well as in the Phillips and Warren patents previously referred to. In case it is desired to provide a swivel joint that provides a low set-up torque, the seal F may be formed in accordance with the teachings of the application of Taylor, S.N. 68,795, filed November 15, 1960, and assigned to the same assignee as the present invention.

The combined dust sealing and pressure relieving ring forming part of the present invention is illustrated generally at D in FIGURE 1. This ring is mounted in an annular recess 34 formed in the outer end of the nipple N of the swivel joint. The annular shape of the sealing ring D is shown in FIGURE 2. The sealing ring D is formed of natural or synthetic rubber or of rubber-like material. If the swivel joint is designed to conduct hydrocarbons or other solvents, the sealing ring will be formed of a material that will not be attacked by the solvents, such as a rubbery copolymer of butadiene and acrylonitrile, known by the trade name of Hycar (OR).

Referring to the sections of FIGURES 4 and 5, the sealing ring D includes a body 40 which is of generally rectangular cross section. The body 40 is formed with a generally radial face 42, and the ring is mounted with face 42 disposed at the axially inner side of the recesss 34 of the nipple N. Face 42 of the sealing ring body has a smooth surface and provides a pressure responsive sealing face. The axially outer face 44 of the body 40 is also generally radially disposed, and provides a seating face for the ring, but does not act as a sealing face. The ring D is provided with an internal groove 46, defined by a generally conical wall 48 that faces away from the sealing face 42, and a generally radial wall 49 that is adjacent the seating face 44.

The sealing face 42 of the body 40 and the generally conical wall 48 of the groove 46 cooperate to provide an axially inner seating lip 50, which has an inner peripheral surface 52 forming a seating face that makes light resilient engagement with the base of the recess 34 in the nipple N. Adjacent the seating face 44 of the ring body, an axially outer seating lip 54 is formed, bounded by the seating face 44 and the generally radial wall 49 of the groove 46. The seating lip 54 also has an inner peripheral surface 56 that seats on the base of the recess 34 in the nipple N and assists in the centering of the sealing ring D in the nipple recess. Extending axially outward and radially outward from the outer peripheral wall 58 of the body 40, is a relatively thin dust sealing lip indicated generally at 60. Lip 60 is bounded by an axially inner conical face 62, and a diverging axially outer conical face 64.

In order to provide for fluid flow from the internal groove 46 formed in the body 40 of the sealing ring D, so that the sealing ring may relieve pressure from within the swivel joint, a plurality of notches 68 (FIGS. 2, 3 and 5) are formed in the body 40 at the seating face 44. These notches are semi-circular in cross section, and extend generally radially of the rectangular body 40.

FIGURE 7 shows the mounting of the sealing ring D in the recess 34 in the nipple N of the swivel joint under normal operating conditions. As illustrated in FIGURE 7 the sealing ring D is serving its normal function of excluding dust, dirt and other foreign material from the bearing area of the swivel joint. The recess 34 in the nipple N is formed with an axially inner, radial wall 70, and an axially outer radial wall 72. The recess 34 has a base or inner peripheral wall 74. The sleeve S of the swivel joint has an inner circumferential wall 76 that closely surrounds the nipple N, but is spaced from the periphery of the nipple sufficiently to insure free relative rotation of the swivel joint parts. As indicated in FIGURE 7, in its free unconfined state the body portion 40 of the dust sealing ring D has an axial width or dimension indicated at $a$ which is slightly larger than the axial spacing $w$ between the axially inner wall 70 of recess 34, and the axially outer wall 72 of the recess. Because of this slight negative clearance, when the sealing ring D is installed in the recess 34 in the nipple N, faces 42 and 44 of the body are in light resilient pressure engagement with the walls 70 and 72 of the recess. Because of the resilient nature of the body portion 40 of the dust sealing ring, this light, resilient pressure engagement between the sealing face 42 of the sealing ring and the axially inner wall 70 of the recess 34 provides a dust excluding seal. The sealing ring and nipple parts are also dimensioned so that the inner peripheral face 52 of the seating lip 50, and the inner peripheray 56 of the seating lip 54 make light pressure engagement with the base 74 of the recess 34 in the nipple. In addition to the initial light sealing engagement at the sealing face 42 and inner face 52 of the seating lip 50, the parts are dimensioned so that the dust sealing lip 60 is deflected radially inwardly by the wall 76 of the sleeve S, so that lip 60 also makes sealing engagement with wall 76, to exclude dust while accommodating relative rotation between the nipple N and the sleeve S. Thus the engagement of dust sealing lip 60 with the inner periphery wall 76 of the sleeve S, the light sealing engagement of the inner peripheral face 52 of the seating lip 50 with the base 74 of the recess, and the light sealing engagement of the sealing face 42 with the inner wall 70 of the recess, all cooperate to exclude dust and foreign matter from the bearing area of the swivel joint. Foreign matter is excluded even though it may have reached the sealing zone between the inner peripheral face 52 and the base 74 of the groove by passing through the radial bleed passages 68 and into the generally annular groove 46 formed in the body of the dust sealing ring.

*Table I.—Nominal dimensions of a 2" swivel joint*

(Maximum pressure—15,000 p.s.i.)

UNDEFORMED DUST SEALING RING (FIG. 6)

| | | |
|---|---|---|
| Body inner diameter, $d1$ | inches | 2.755 |
| Body outer diameter, $d2$ | do | 3.046 |
| Dust sealing lip diameter, $d3$ | do | 3.165 |
| Ring width, $a$ | do | 0.203 |
| Outer seating lip width, $b$ | do | 0.031 |
| Inner seating lip width, $c$ | do | 0.025 |
| Groove depth, $e$ | do | 0.085 |
| Groove wall angle, $x$ | degrees | 60 |
| Dust seal lip angle, $y$ | do | 65 |
| Dust seal lip angle, $z$ | do | 45 |
| Bleed passage radius, $r$ | inches | 3/32 |
| Durometer on Shore Scale A | | 80 |

SWIVEL JOINT DIMENSION (FIG. 7)

| | | |
|---|---|---|
| Sleeve inner diameter, $d4$ | inches | 3.144 |
| Nipple outer diameter, $d5$ | do | 3.108 |
| Diameter base of recess, $d6$ | do | 2.765 |
| Recess width, $w$ | do | 0.195 |

Before proceeding with the description of the mode of operation of the sealing ring D in the swivel joint of the present invention upon occasion of failure of the main fluid seal F, reference is made to Table I and FIGURES 6 and 7 of the drawings which provide certain basic dimensions of a typical installation. As indicated in Table I, the dimensions given are those for a typical nominal 2 inch diameter swivel joint. This designation indicates that the fluid passage through the swivel joint is approximately 2 inches in diameter. The dimensions and angles given in Table I and referred to in FIGURES 6 and 7 are provided merely as examples of a typical design for one size of swivel joint, in order to provide sufficient information for those skilled in the art to practice the invention with any sizes of swivel joints. The dimensions and angles given in Table I are not to be construed as limiting, except insofar as they are referred to in the appended claims.

FIGURE 8 is a diagrammatic illustration of the mode of operation of the dust sealing ring D of the present invention in case of failure of the primary fluid seal F. Upon such failure, the previously confined fluid under pressure passes between the nipple and sleeve members, around the bearing of journal 16, and reaches the dust sealing ring D. When the pressurized fluid encounters sealing ring D, some of the fluid works its way between the sealing face 42 of the sealing ring and the axially inner wall 70 of the recess 34 in the nipple. This fluid exerts an axial pressure against the sealing face 42, as illustrated by the dashed arrows $p$ in FIGURE 8. This pressure moves the sealing face 42 away from the associated wall 70 of the recess 34, and consequently causes an axial shortening of the body portion 40 of the sealing ring D. Since the sealing ring is partially confined in its recess, this axial shortening of the sealing ring causes the rubber material thereof to flow. Such flow is partially accommodated by bulging of the conical wall 48 of the internal groove 46. The axial shortening of the rubber sealing ring is also partly accommodated by an enlargement in the circumference of the body portion of the ring disposed adjacent the seating lif 50. This enlargement of the ring circumference further deflects the dust sealing lip 60, and presses it against the peripheral wall 58 of the body 40. The enlargement of the ring circumference simultaneously causes the inner face 52 of the seating lip 50, which was formerly in light sealing engagement with the base 74 of the recess 34, to be retracted from its sealing engagement with the base 74. The effect of this circumferential elongation of the sealing ring is illustrated by the dashed vertical arrow $v$. As a result of these combined actions, namely the axial shortening of the body and the resultant circumferential elongation of the body, a gap $g$ is opened between the sealing face 42 and the associated wall 70 of the recess, and another gap $h$ is opened between the peripheral face 52 of the seating lip 50 and the base 74 of the recsss. As soon as these gaps $g$ and $h$ are formed by the action of fluid pressure on the sealing ring, an escape passage is provided for the high pressure fluid through the gaps $g$ and $h$, into the annular groove 46, and out through the radial passages or notches 68. This flow, which is indicated by the solid arrows in FIGURE 8, relieves the pressure within the swivel joint and bleeds fluid to atmosphere, without permitting it to exert its full force upon the nipple parts of the swivel joint, such as the access plug 24 mounted in the sleeve.

The relief valve action of the dust sealing ring D continues until the pressure source to the swivel joint is cut off by a valve or the like, and prevents the generation of full line pressure within the bearing zone of the swivel joint. This eliminates the danger that would arise if parts of the swivel joint, such as the threaded access plug 24, were forcibly broken loose from the sleeve by stripping of the threads. Thus it can be seen that even though the dust sealing lip 60 is jammed between the sealing ring body and the surrounding sleeve wall 76, so as to prevent the escape of internal fluid past the dust sealing lip 60, the circumferential lengthening action that occurs in response to the axial shortening of the sealing ring body, provides for escape of high pressure fluid. That the mode of operation described and indicated diagrammatically in FIGURE 8 does occur, has been proven by a series of radiographic examinations by X-rays, on various dust seal constructions, both under their normal conditions of operation, and in the condition wherein they are subjected to high internal fluid pressures.

FIGURE 9 of the drawings illustrates a swivel joint embodying the invention but of a somewhat different mechanical design. In the swivel joint construction of FIGURE 9 a double row ball bearing and race assembly is mounted between the nipple and sleeve parts, and serves the function of the two rows of balls 20 described in connection with the swivel joint 10 of FIGURE 1.

Referring more specifically to FIGURE 9, the modified swivel joint 10a is provided with a pipe section 12a which ends in a composite nipple N1. The swivel joint 10a includes a second pipe section 14a that ends in a composite sleeve S1. The nipple N1 includes a body portion 80 having an internally threaded projection 82 that forms a seat for the inner race of the bearing. The bearing is indicated generally at 84, and is of the double row, two race ball bearing type. The bearing is of standard construction, and the details thereof form no part of the present invention. As can be seen in FIGURE 9, the inner race of the bearing 84 seats on the projection 82 of the body portion 80 of the nipple. In order to retain the inner race of the bearing 84 on the nipple extension, the nipple is provided with a collar portion 86 having an externally threaded extension 88, which screws within the internally threaded bearing seat 82. In accordance with conventional practice the body and collar portions of the nipple provide opposed shoulders that confine the inner race of the ball bearing 84 on the nipple.

The composite sleeve S1 of the swivel joint 10a has a body portion 92 formed with an externally threaded seat portion 94 that receives the outer race of the bearing 84. Composite sleeve S1 also includes a collar portion 96, which has an internally threaded extension 98 that is screwed into the seat portion 94. Thus the body portion 92 and the collar portion 96 of the composite sleeve S1 cooperate to confine the outer race of bearing 84 within the sleeve S1. The inner end of the nipple N1, and the inner end of the sleeve S1, are provided with a primary fluid seal F, which performs the same function in the same manner as the seal F of the previously described embodiment. Similarly, the outer end portion of the nipple N1 of the swivel joint of FIGURE 9, is provided with an annular recess 102, which receives a combined dust sealing and fluid relieving sealing ring D, like that previously described.

An examination of FIGURE 9 reveals that, as in the swivel joint construction of FIGURE 1, if the primary seal F fails, and if the dust sealing ring D is exposed to pressure fluid trapped within the swivel joint, then the separable parts of the composite parts of the sleeve and nipple portions of the swivel joint could be broken loose, causing a dangerous condition. However, the combined dust sealing and pressure relieving ring D mounted in recess 102 of nipple N1 of the swivel joint of FIGURE 9, functions to prevent occurrence of this dangerous situation, by relieving the fluid pressure that reaches the bearing portions of the swivel joint, in the same manner as the embodiment of the invention, which was described in connection with FIGURE 8.

While particular embodiments of the present invention have been shown and described, it will be understood that the swivel joint is capable of modification and variation without departing from the principles of the invention and that the scope of the invention should be limited only by the scope and proper interpretation of the claims appended hereto.

The invention having thus been described, what is believed to be new and desired to be protected by Letters Patent is:

1. A swivel joint comprising two pipe sections, one of said sections terminating in a nipple and the other section terminating in a sleeve closely surrounding said nipple, said nipple having therein an annular recess disposed within the outer end portions of said sleeve, said recess having axially and oppositely facing inner and outer walls and having a base, a combined internal fluid pressure relieving and dust excluding sealing ring in said recess, said sealing ring comprising a body of rubber-like material having an axially inner sealing face and an axially outer seating face, said body having a free axial width that is slightly greater than the axial width of said recess so that said faces of the body are in initial light pressure engagement with respectively said axially and oppositely facing walls of the recess, a relatively thin dust sealing lip extending outwardly from the periphery of said body, said dust sealing lip being in resilient sealing engagement with said sleeve, said body being formed with an internal generally annular groove, said groove having a generally conical wall facing away from said sealing face of the body such that the mass of said material contained generally between said groove and said seating face is less than the mass of said material contained generally between said conical wall and said sealing face, said body having a plurality of fluid drain notches formed at the seating face thereof for conducting fluid from said groove and through said body, the inner periphery of said body adjacent said sealing face of the body forming a seating lip that is in initial light pressure engagement with the base of said recess.

2. In a swivel joint including an inner conduit and an outer conduit surrounding the inner conduit so that a space is defined therebetween, the inner conduit having an external annular groove defined by confronting generally radial walls and a base between said walls, a relievable fluid seal comprising an annular body of resiliently compressible and expandable material, said body being compressed between said radial walls and being in spaced relation to said outer conduit, said body having a first end portion of predetermined radial dimension normally engaging said base and one of said radial walls, said body also having an intermediate portion convergently projecting, in a generally axial direction, from said first end portion toward a second end portion which has a radial dimension less than said predetermined dimension and which engages said second radial wall, said second end portion including an inner lip projecting radially inward and engaging said second radial wall and said base, said seal also having an outer lip projecting outward from said body and resiliently bearing against said outer conduit thereby dividing said space into high and low pressure sections respectively adjacent to said first and second end portions of the body, the intermediate portion of said body having a fluid passage therethrough which establishes fluid communication between said low pressure section and a portion of said groove between the base and said intermediate portion, said first end portion being movable away from said one radial wall and said base upon application of predetermined fluid pressure in said high pressure section whereby fluid communication is established between said high pressure section and said portion of the groove in order to effect communication between said sections around said outer lip.

3. The swivel joint according to claim 2 wherein said intermediate portion is provided with an inner frustoconical surface, said surface diverging from said first end portion to said second end portion.

4. A swivel joint comprising two pipe sections, one of said sections terminating in a nipple and the other section terminating in a sleeve closely surrounding said nipple with a space therebetween, said nipple having therein an annular recess disposed within the outer end portion of said sleeve, said recess having axially and oppositely facing inner and outer walls, and having a base; and a combined internal fluid pressure relieving and dust excluding sealing ring in said recess, said sealing ring comprising a resiliently axially deformable body having an annular resiliently diametrically expandable first end portion, an intermediate portion projecting from said first end portion to a second end portion, said first end portion having an axially inner sealing face, said second end portion having an axially outer seating face, the free axial width between said sealing face and said seating face being slightly greater than the axial width of said recess so that said faces are in initial light pressure engagement with respectively said axially and oppositely facing walls of said recess, said intermediate portion having an inner annular generally conical surface that is tapered from a minimum diameter at the intersection of said conical surface and said first end portion to a maximum diameter adjacent to the intersection of said conical surface and said second end portion, said second end portion including an inner lip projecting inward from said conical surface where said conical surface joins said second end portion, said conical surface and said lip forming an internal generally annular groove, said body having an outer surface extending from said first to said second end portions, said intermediate portion having a fluid passage extending therethrough from said conical surface to said outer surface, the inner periphery of said first end portion adjacent to said sealing face forming a seating lip that is in light pressure engagement with said base of said recess, and a relatively thin outer dust sealing lip projecting outward from said outer surface and across said space into resilient sealing engagement with said sleeve, said dust sealing lip dividing said space into first and second sections, said intermediate portion causing said sealing face of said first end portion to move away from its associated axially facing wall of said recess and causing said seating lip of said first end portion to move away from said base upon application of fluid pressure from one of said sections against said first end portion for establishing a fluid path between said first end portion and its said associated axially facing wall and base and through said intermediate portion to provide said sections in fluid communicating relation while said sealing lip remains in sealing engagement with said sleeve.

5. A sealing ring comprising an annular body of resiliently deformable material circumscribing a reference axis and having opposite ends, said body having sealing and seating faces at said opposite ends, said faces projecting in a generally radial direction with respect to said axis and facing in opposite directions from each other, said body also having a generally cylindrical outer wall of substantially uniform diameter extending between said faces, said body having an inner wall surrounding said axis and including first and second generally cylindrical segments respectively projecting axially inward toward each other from said sealing and seating faces and being of substantially the same diameter, said inner wall also including a third segment projecting generally radially outward from said second segment and being closer to said seating face than to said sealing face, and said inner wall further including a fourth segment extending between said first and third segments and being non-parallel with said outer wall, said body including a lip projecting outward from said outer wall, said body having a passage extending therethrough between said inner wall and said outer wall and being located on the opposite side of said lip from said sealing face.

6. The ring of claim 5 wherein said fourth segment of the inner wall is frusto-conical and diverges from said first segment to said third segment.

7. The ring of claim 5 wherein said first and second segments are of substantially the same axial length and substantially shorter than the length of said fourth segment.

8. The ring of claim 5 wherein said passage opens out of said body from said outer wall, said seating face, and said second, third and fourth segments of said inner wall.

9. The ring of claim 5 wherein said lip is in oblique relation to said peripheral wall and is divergent in a direction toward said seating face.

10. The seal of claim 5 wherein the radial dimension of said third segment, as measured from said second segment to said fourth segment, is in the order of one-half of the radial dimension of either of said faces as measured from the inner wall to the outer wall.

References Cited by the Examiner

UNITED STATES PATENTS

| | | | |
|---|---|---|---|
| 2,459,981 | 1/1949 | Warren | 285—276 X |
| 2,511,386 | 6/1950 | Warren | 285—276 X |
| 2,614,793 | 10/1952 | Storm | 277—177 X |
| 2,688,500 | 9/1954 | Scott | 285—13 |
| 2,906,548 | 9/1959 | Faccou | 285—14 |
| 2,916,043 | 12/1959 | Rickard | 285—13 X |
| 3,031,200 | 4/1962 | Hamer | 277—177 |
| 3,089,713 | 5/1963 | Scaramucci | 285—14 |

FOREIGN PATENTS

| | | |
|---|---|---|
| 70,496 | 12/1958 | France. |
| 551,816 | 6/1932 | Germany. |
| 826,521 | 1/1960 | Great Britain. |

CARL W. TOMLIN, *Primary Examiner.*

THOMAS F. CALLAGHAN, *Assistant Examiner.*